(12) United States Patent
Bose et al.

(10) Patent No.: US 7,472,038 B2
(45) Date of Patent: Dec. 30, 2008

(54) METHOD OF PREDICTING MICROPROCESSOR LIFETIME RELIABILITY USING ARCHITECTURE-LEVEL STRUCTURE-AWARE TECHNIQUES

(75) Inventors: Pradip Bose, Yorktown Heights, NY (US); Zhigang Hu, Ossining, NY (US); Jude A. Rivers, Cortlandt, NY (US); Jeonghee Shin, Millwood, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/735,533

(22) Filed: Apr. 16, 2007

(65) Prior Publication Data

US 2008/0256383 A1    Oct. 16, 2008

(51) Int. Cl.
*G06F 11/30* (2006.01)
*G06F 15/00* (2006.01)
*G21C 17/00* (2006.01)

(52) U.S. Cl. .................... 702/182; 702/82; 324/537; 324/760

(58) Field of Classification Search .............. 702/81–84, 702/182, 186; 700/108–110; 324/500, 537, 324/760–765; 714/1, 47, 25
See application file for complete search history.

(56) References Cited

U.S. PATENT DOCUMENTS

| | | | |
|---|---|---|---|
| 4,356,546 A | 10/1982 | Whiteside et al. | |
| 4,464,717 A | 8/1984 | Keeley et al. | |
| 4,562,575 A | 12/1985 | Townsend | |
| 4,590,554 A | 5/1986 | Glazer et al. | |
| 5,193,175 A | 3/1993 | Cutts, Jr. et al. | |
| 5,278,847 A | 1/1994 | Helbig, Sr. et al. | |
| 5,295,258 A | 3/1994 | Jewett et al. | |
| 5,408,649 A | 4/1995 | Beshears et al. | |
| 6,519,673 B1 | 2/2003 | Chudnovsky et al. | |
| 6,654,910 B1 | 11/2003 | Eibach et al. | |
| 6,931,567 B2 | 8/2005 | Tanaka et al. | |
| 6,944,798 B2 | 9/2005 | Stephenson et al. | |

(Continued)

OTHER PUBLICATIONS

Khan, 'Bulk Load Points Reliability Evaluation Using a Security Based Model', May 1998, IEEE Publication, vol. 13, No. 2, pp. 456-463.*

*Primary Examiner*—Edward Raymond
*Assistant Examiner*—Elias Desta
(74) *Attorney, Agent, or Firm*—Cantor Colburn LLP; Lisa M. Yamonaco

(57) ABSTRACT

A method of predicting the lifetime reliability of an integrated circuit device with respect to one or more failure mechanisms includes breaking down the integrated circuit device into structures; breaking down each structure into elements and devices; evaluating each device to determine whether the device is vulnerable to the failure mechanisms and eliminating devices determined not to be vulnerable; estimating, for each determined vulnerable device, the impact of a failure of the device on the functionality of the specific element associated therewith, and classifying the failure into a fatal failure or a non-fatal failure, wherein a fatal failure causes the element employing the given device to fail; determining, for those devices whose failures are fatal, an effective stress degree and/or time; determining one or more of a failure rate and a probability of fatal failure for the devices, and aggregating the same across the structures and the failure mechanisms.

24 Claims, 7 Drawing Sheets

U.S. PATENT DOCUMENTS 7,292,058 B2 * 11/2007 Anderson et al. ........... 324/765
2005/0257078 A1 11/2005 Bose et al.
2006/0080062 A1 4/2006 Bose et al.

* cited by examiner

METHOD OF PREDICTING MICROPROCESSOR LIFETIME RELIABILITY USING ARCHITECTURE-LEVEL STRUCTURE-AWARE TECHNIQUES

BACKGROUND

The present invention relates generally to lifetime reliability analysis of semiconductor devices and, more particularly, to a method and system of predicting semiconductor device lifetime reliability using architecture-level structure-aware techniques.

Lifetime reliability has become one of the major concerns in microprocessor architectures implemented with deep submicron technologies. In particular, extreme scaling resulting in atomic-range dimensions, inter and intra-device variability, and escalating power densities have all contributed to this concern. At the device and circuit levels, many reliability models have been proposed and empirically validated by academia and industry. As such, the basic mechanisms of failures at a low level have been fairly well understood, and thus the models at that level have gained widespread acceptance. For example, Black's equation of electromigration is a well-accepted model of failures applicable to on-chip wires.

In recent work (e.g., U.S. Patent Application Publication Nos. 20050257078 and 20060080062, assigned to the assignee of the present application), lifetime reliability models for use with single-core architecture-level, cycle-accurate simulators have been disclosed. These disclosures focus on modeling certain major failure mechanisms, including electromigration (EM), negative bias temperature instability (NBTI) and time dependent dielectric breakdown (TDDB). The models discussed therein rely on several key assumptions that make it difficult to extend the models directly to cover the entire chip having many different (heterogeneous) components.

For example, the baseline (target) total failure rate measured in Failures in Time (FITs) is assumed to be evenly distributed across all of the modeled failure mechanisms. FITs are the standard method of reporting constant failure rates for semiconductor components, which is the number of failures seen in $10^9$ hours. The mean time to failure (MTTF) of a component, another lifetime reliability metric, is inversely related to this constant failure rate; i.e., MTTF=$10^9$/FITs. However, this is somewhat of an arbitrary axiom since some failure mechanisms can be more severe than others, and since technology scaling affects the failure mechanisms in different ways and degrees.

In addition, lifetime reliability models proposed to this point assume a uniform device density over the chip and an identical vulnerability of devices to failure mechanisms. As a result, the failure rates estimated by such models tend to be proportional to chip area, regardless of the exact component mix within that area. However, an examination of the floorplan or photomicrograph of any modern microprocessor chip reflects heterogeneity across the die area, and thus consequent limitations of such an assumption.

Accordingly, for accurate lifetime reliability estimation, basic axioms such as those above adopted by prior architecture-level reliability models need to be improved based on a detailed understanding of the implementation of modern microprocessor architecture components and the characteristics of failure mechanisms.

SUMMARY

In an exemplary embodiment, a method of predicting the lifetime reliability of an integrated circuit device with respect to one or more defined failure mechanisms includes breaking down the integrated circuit device into microarchitecture structures; further breaking down each structure into one or more of elements and devices, with a device comprising a sub-component of an element; determining, for each vulnerable device, the impact of a failure of the device on the functionality of the specific element associated therewith, and classifying the failure into one of a fatal failure and a non-fatal failure, wherein a fatal failure of a given device is one in which the failure causes the element employing the given device to fail; determining, for those devices whose failures are classified as fatal, one or more of an effective stress degree and an effective stress time based on one or more architecture-level events and states; determining one or more of a failure rate and a probability of fatal failure for the devices, using the one or more of the associated effective stress degree and effective stress time; and aggregating the one or more of the failure rate of the devices and the probability of fatal failures of the devices, across the structures for the one or more defined failure mechanisms.

BRIEF DESCRIPTION OF THE DRAWINGS

Referring to the exemplary drawings wherein like elements are numbered alike in the several Figures.

DETAILED DESCRIPTION

Disclosed herein is a robust structure-aware lifetime reliability modeling method and system that is implemented at the architecture-level, wherein the microarchitecture is first broken down into structures that in turn are further broken down into subcircuits including transistors, wires and vias (collectively referred to herein as "devices"). Each device is categorized as vulnerable or non-vulnerable with respect to the various failure mechanisms, and thus is "weeded out" from lifetime reliability analysis accordingly. Further, for those devices that are categorized as vulnerable, the embodiments further determine whether a failure of such a device is "fatal" or "non-fatal," wherein a fatal failure is one in which the failure causes a circuit employing the given device to fail.

Once a vulnerable, "fatal failure" device for a given failure mechanism (e.g., EM, NBTI, TDDB) is identified, the effective stress condition of the device is evaluated, instead of simply assuming a constant stress condition. For example, depending upon architecture-level events or states, the effective stress degree and/or time of one device may be greater or less than a similar device for a given failure mechanism. Such events or states may include, for example, the amount of current passed in a via, the frequency of access of a transistor, or the state of data in an array. Then, using relative stress condition information for those identified vulnerable/fatal devices, a more robust FIT for the device can be expressed.

In addition, the inventive embodiments also separate architecture-level factors from technology and environment dependent parameters so as to allow a user to abstract the analysis of processor lifetime reliability from technology level effects. In particular, the disclosed methodology introduces a technology-independent unit of reliability, referred to herein as the FIT of a reference circuit or "FORC" for each failure type. FORC describes the failure rate, in FITs, of a specially defined reference circuit that is easy to model and understand while, at the same time, effective at representing the basic mechanism of a certain type of failures. As such, the failure rate of a given structure or unit on a chip, in the context of a given failure mechanism (e.g., electromigration), may be computed in relative FORC units, instead of in absolute FITs that are technology and environment dependent.

Figure 1:
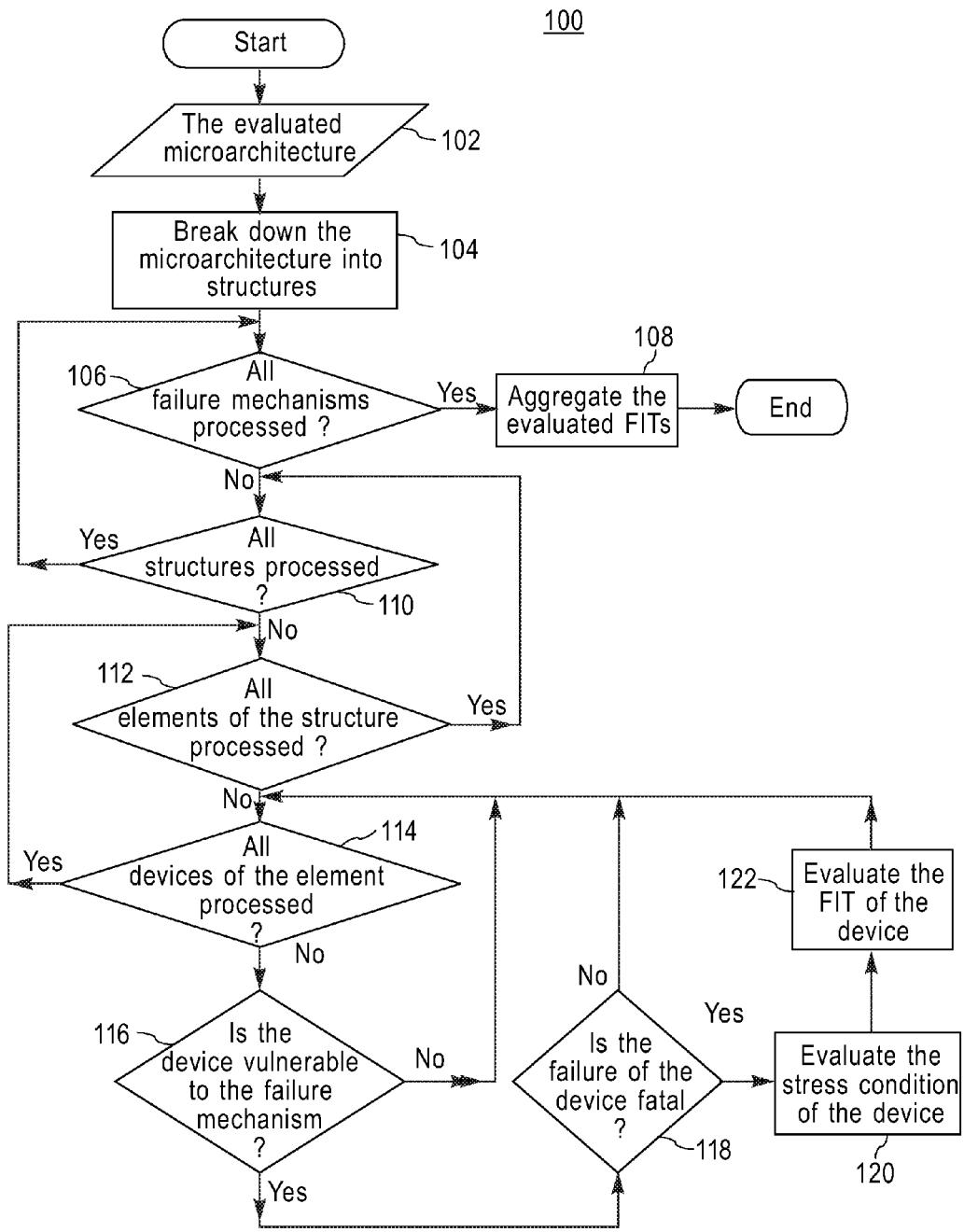
FIG. 1 is a flow diagram illustrating a structure-aware method of predicting the lifetime reliability of an integrated circuit device with respect to one or more defined failure mechanisms, in accordance with an embodiment of the invention.

Referring now to FIG. 1, there is shown a flow diagram illustrating a structure-aware method 100 of predicting the lifetime reliability of an integrated circuit device with respect to one or more defined failure mechanisms. For a given microarchitecture analyzed in block 102 (e.g., a microprocessor), the microarchitecture is broken down into basic structures (e.g., arrays, register files, latches, multiplexers, logic gates and repeated wires), as reflected in block 104. These structures are evaluated in terms of lifetime reliability or FIT rates due to various failure mechanisms as discussed above. Decision block 106 is an exit condition for determining whether all of the failure mechanisms of interest (e.g., EM, NBTI, TDDB) have been processed, and if so, the individually determined FITs are aggregated as reflected in block 108. Further detail concerning the aggregations is provided hereinafter.

Assuming one or more failure mechanisms are still under analysis, decision block 110 is an exit condition for determining whether each of the structures identified in block 104 have been processed for that particular mechanism. If so, the method 100 loops back to decision block 106 to see whether all failure mechanisms have then been processed. Assuming that all structures for a given failure mechanism have not been processed, another decision block (block 112) determines, upon further breakdown of each structure into individual elements (e.g., bitlines, wordlines, cells, etc.), whether each element of the structure has been processed. If so, the method 100 loops back to decision block 110 to again see whether all structures have been processed. If not, each of the elements is then further broken down into individual devices (e.g., transistors, vias, wires, etc.). Decision block 114 represents an exit condition to determine whether each identified device has been processed, and either returns to decision block 112 or proceeds to decision block 116.

Decision block 116 represents a first criteria by which devices are "weeded out" from FIT evaluation. Specifically, it is determined whether the device is vulnerable to the particular failure mechanism under analysis. The determination of vulnerability depends on both the device under consideration and the failure mechanism itself. While specific analytic examples of device vulnerability are presented hereinafter, one example of a vulnerable device in the context of electromigration would be a via structure having unidirectional current passing therethrough. Conversely, a device such as a PFET is not vulnerable to electromigration, but is susceptible to (for example) TDDB or NBTI, depending on how the transistor is configured in its associated element or sub-circuit.

In any event, if a given device is not considered vulnerable to the failure mechanism under examination, the method 100 loops back to decision block 114. However, if the device is considered vulnerable to the failure mechanism under examination, a further inquiry is made at decision block 118. Specifically, it is determined whether a failure of such a vulnerable device constitutes a "fatal" failure. In so doing, only fatal failures are taken into account for the lifetime reliability of the microarchitecture, thereby providing a more accurate FIT rate estimation. As indicated above, a fatal failure is one in which the failure causes a circuit employing the given device to fail. If the failure of a vulnerable device is not a fatal failure, that device is also excluded from FIT analysis and the method loops to decision block 114. On the other hand, if the failure of a vulnerable device is in fact a fatal failure, then the method 100 proceeds to block 120 where the stress condition of the device is evaluated with respect to the failure mechanism in order to take into account only effective stress time or degree for accurate lifetime prediction. The effective stress time or degree is then expressed by architecture-level events or states. Using this condition, the FIT of the device is evaluated based on reliability models of the failure mechanism in block 122. Additional detail concerning specific FIT evaluations is presented hereinafter.

Again, once all of the devices of the element are evaluated (decision block 114), the next element is processed (decision block 112). Once all the elements of the structure are processed, the same process is repeated for the next structure (i.e., returning to decision block 110). When all the structures are processed for all the failure mechanisms (decision block 106), the evaluated FIT rates of the structures due to the failure mechanisms are aggregated in block 108. As discussed below, exemplary approaches to aggregate the failure rates of structures include summation and weighted summation.

Figure 2:
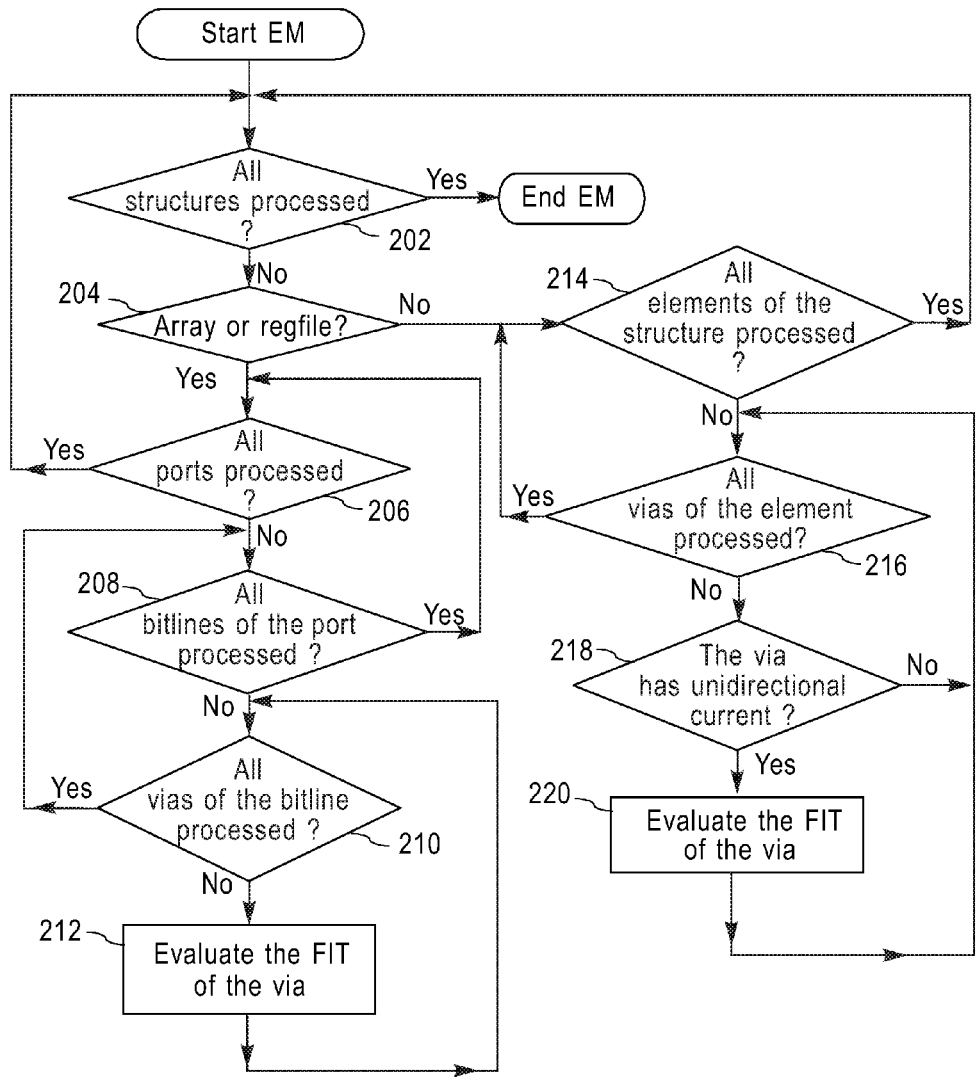
FIG. 2 is a flow diagram illustrating a more detailed subroutine to estimate the FIT rates of structures due to electromigration, in accordance with a further embodiment of the invention.

Referring now to FIG. 2, there is shown a flow diagram illustrating a more detailed subroutine 200 to estimate the FIT rates of structures due to electromigration, in accordance with a further embodiment of the invention. Decision block 202 is analogous to decision block 110 of FIG. 1, in that once all structures are processed for electromigration failure analysis, the EM subroutine is completed. In block 204, it is determined whether the particular structure is an array or register file. For a relatively organized structure such as an array or register file, each port therein is further analyzed with respect to electromigration. Thus, decision block 206 provides a return loop to the next structure once all ports in a structure are processed. If not, the subroutine proceeds to decision block 208 for a further breakdown, in terms of processing bitlines.

Array and register file structures include several elements such as bitlines, wordlines, and memory cells. However, among these elements, bitlines include vias having unidirectional current flow between the bitlines and pass transistors. These are the particular elements within such structures having vulnerability with respect to electromigration. Moreover, failures of bitline vias in arrays and register files represent fatal failures. Thus decision block determines whether each via for a bitline has been processed. If not, the subroutine proceeds to block 212.

Each via in every bitline of every port is evaluated for the FIT rate in block 212, based on current density through the via. For local read bitlines of register files, the current density of the via is the product of the number of reads of "1" of the cell through the bitline and the amount of local bitline capacitance discharged through the via for one read. For local bitlines for arrays, the current density of the via is the sum of current due to reads of "0" and current due to writes of "1." For their complementary bitlines, the current density is the sum of current due to reads of "1" and current due to writes of "0." For global bitlines of both structures, the current density of the via is the product of the total number of accesses of local bitlines associated to the global bitline and the amount of global bitline capacitance discharged through the via for one access. Once all the vias of the bitline are evaluated (block 210), the next bitline is processed (block 208). Once all the bitlines of the port are processed, the same steps are repeated for the next port (block 206). Once all the ports of the array or register file structure are processed, the next structure is processed (block 202).

If the current structure in the electromigration subroutine is neither an array nor a register file, the subroutine 200 proceeds to decision block 214, which is a return condition once all elements of the structure are processed. In particular, each via of every element of the structure is evaluated (decision block 216) to see whether or not the via is subject to domination by unidirectional current flow. If the via is not dominated by unidirectional current (e.g., integration of the charge flowing through the cross section of the wire over the clock cycle) as reflected in decision block 218, then the subroutine 200 loops back to decision block 216 to check the next via. On the other hand, if the via is dominated by unidirectional current, the FIT of the via is evaluated in block 220 by calculating the amount of the current through the via. More specifically, the number of accesses of metal line employing the via is multiplied by the amount of metal line capacitance discharged or charged through the via due to each access.

When all the structures of the microarchitecture are processed (block 202), the FIT rate estimation with respect to the electromigration failure mechanism is completed. In terms of FIG. 1, this represents a return to decision block 106.

Figure 3:
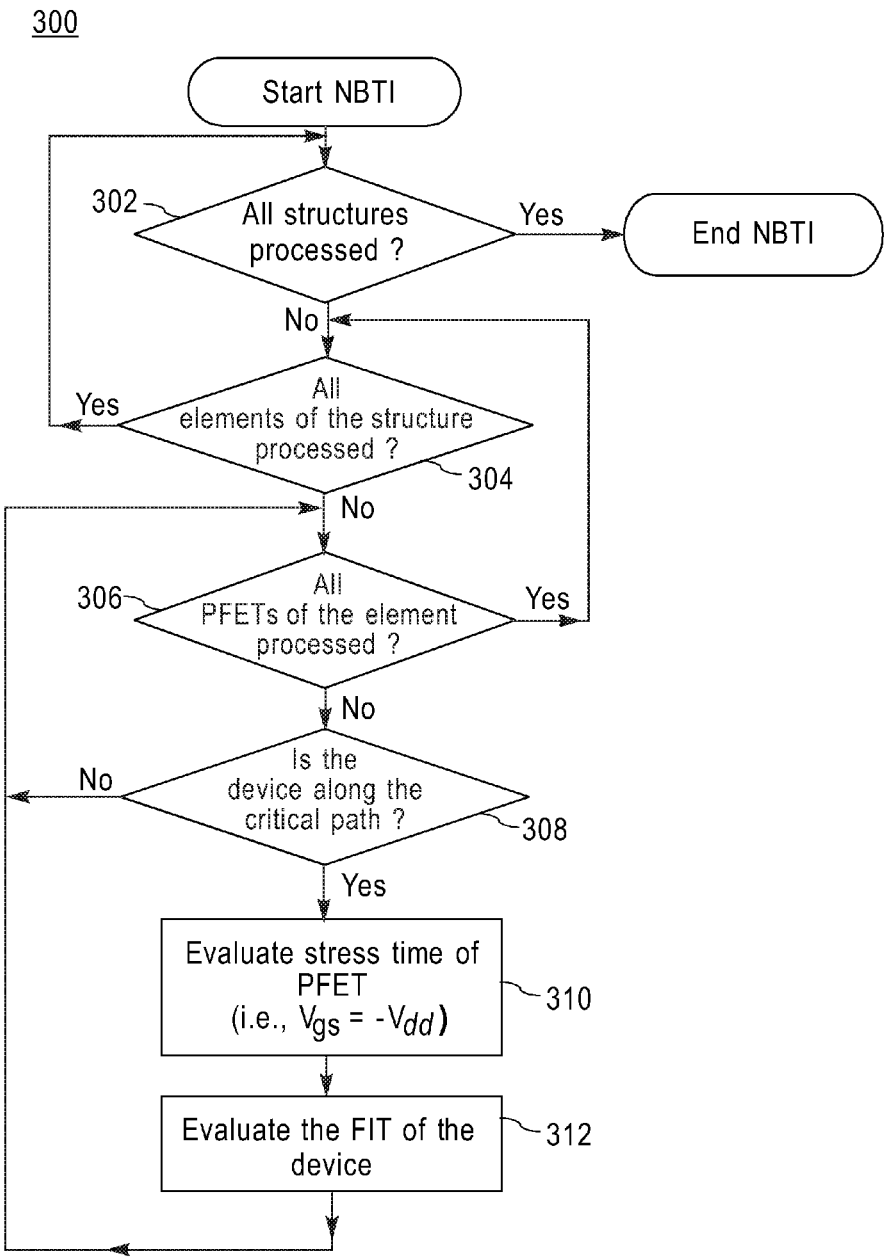
FIG. 3 is a flow diagram illustrating a more detailed subroutine to estimate the FIT rates of structures due to NBTI, in accordance with a further embodiment of the invention.

Referring now to FIG. 3, there is shown a flow diagram illustrating a more detailed subroutine 300 to estimate the FIT rates of structures due to NBTI, in accordance with a further embodiment of the invention. Decision block 302 is analogous to decision block 110 of FIG. 1, in that once all structures are processed for NBTI failure analysis, the NBTI subroutine is completed. In decision block 304, it is similarly determined whether each element of the structure has been processed. At the element level, only PFET devices are examined for NBTI failure analysis because they are the only devices vulnerable to NBTI, as reflected in decision block 306. More specifically, for NBTI analysis purposes, PFET devices are considered under stress only when their gate voltage is low (e.g., ground) and their source voltage is high (e.g., $V_{dd}$).

Accordingly, as shown in decision block 308, each PFET device of every element of every structure is evaluated to see whether or not it is along a critical path such that the failure of the device (which results in an increased delay of zero-to-one and/or one-to-zero transitions thereof) is fatal. If not, the PFET is not further considered in the analysis (for accurate FIT rate estimation purposes) and the subroutine 300 loops back to decision block 306. However, if so, then the stress time of the PFET device is evaluated in block 310, in terms of the relative duration the gate voltage is low and the source voltage is high. Then, in block 312, the FIT rate of the device is evaluated, based on its effective stress time or duty cycle. Once all the PFET devices of the element are evaluated (block 306), the next element is processed (block 304). Once all the elements of the structure are processed, the same steps are repeated for the next element (block 302). When all the structures of the microarchitecture are processed (block 110 of FIG. 1), the FIT rate estimation due to the NBTI failure mechanism is complete (i.e., returning to block 106 in FIG. 1).

Figure 4:
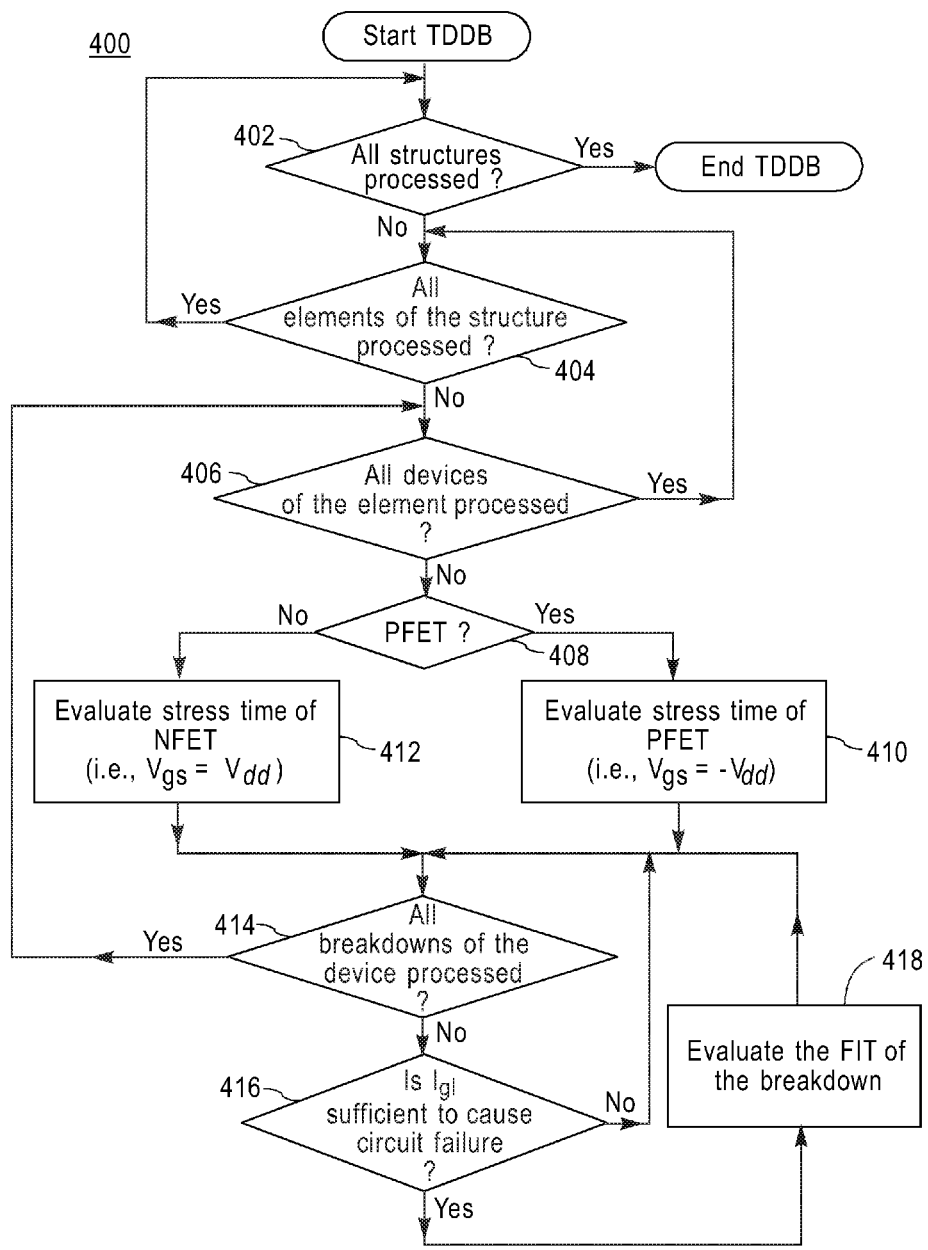
FIG. 4 is a flow diagram illustrating a more detailed subroutine to estimate the FIT rates of structures due to TDDB, in accordance with a further embodiment of the invention.

Referring now to FIG. 4, there is shown a flow diagram illustrating a more detailed subroutine 400 to estimate the FIT rates of structures due to TDDB, in accordance with a further embodiment of the invention. Decision block 402 is analogous to decision block 110 of FIG. 1, in that once all structures are processed for TDDB failure analysis, the TDDB subroutine is completed. In decision block 404, it is similarly determined whether each element of the structure has been processed. Then, in decision block 406, it is determined whether each device of the elements has been processed.

At the device level, only FET devices are examined for TDDB failure analysis, as FETs include thin gate dielectrics. In other words, only FET devices are vulnerable to TDDB. As shown in decision block 408, the polarity of the FET is determined (PFET versus NFET). If the device is a PFET, its stress time is evaluated by determining the relative duration the gate voltage is low and the source and drain voltage is high, as shown in block 410. Conversely, if the device is an NFET, its stress time is evaluated by determining the relative duration the gate voltage is high and the source and drain voltage is low, as shown in block 412. In either instance, the subroutine 400 proceeds to decision block 414 to determine whether each possible breakdown of the device (e.g., gate to source, gate to drain) has been processed. The processing (i.e., fatal failure determination) is implemented in decision block 416. That is, decision block 416 evaluates whether the breakdown of the device leads to the failure of circuits employing the device. In the case of TDDB, a breakdown is fatal or causes circuit failure if gate leakage current ($I_{gl}$) due to the oxide breakdown exceeds that which can be tolerated by the logic driving the devices.

Thus, if the device is vulnerable to TDDB and the failure of the device is fatal, the FIT rate of the device is evaluated in block 418, based on its effective stress time. Otherwise, the FIT of the breakdown need not be taken into account for accurate FIT rate estimation. Once all the breakdowns of the device are evaluated (block 414), the next device is processed (block 406). Once all the devices of the element are processed, the same steps are repeated for the next element (block 404). When all the structures of the microarchitecture are processed (block 402), the FIT rate estimation due to the TDDB failure mechanism is completed (i.e., the subroutine exits to block 106 in FIG. 1).

Figure 5:
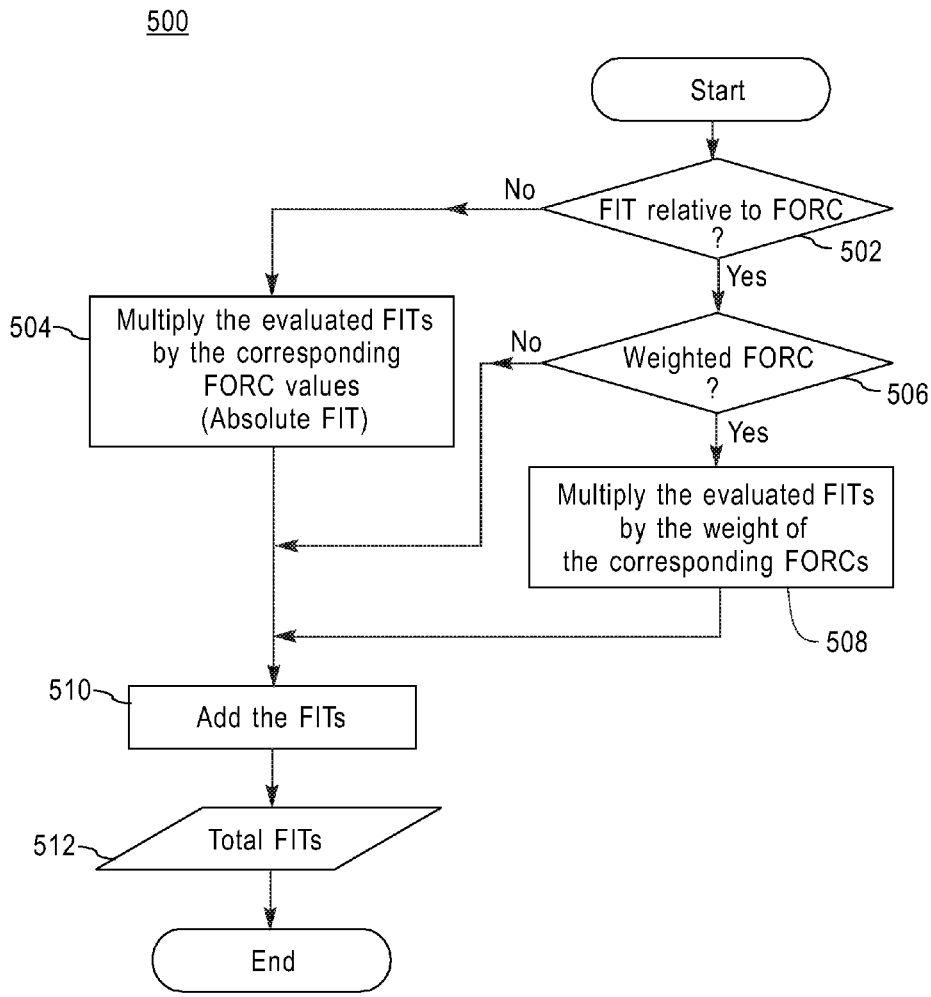
FIG. 5 is a flow diagram illustrating a more detailed subroutine to aggregate the estimated FIT rates of multiple structures due to various failure mechanisms, in accordance with a further embodiment of the invention.

Referring now to FIG. 5, there is shown flow diagram illustrating a more detailed subroutine 500 to aggregate the estimated FIT rates of multiple structures due to various failure mechanisms, in accordance with a further embodiment of the invention. As indicated above, subroutine 500 is initiated once all of the failure mechanisms have been processed. Thus, subroutine 500 represents a more detailed exemplary implementation of block 108 of FIG. 1.

In the above described subroutines 200, 300, 400, for EM, NBTI and TDDB, respectively, the FIT or failure rates are computed in terms of the technology/environment-independent FORC metric defined for each of the failure mechanisms. The estimated FIT rates of multiple structures and failure mechanisms can be combined in absolute FIT values or, alternatively, relative failure rate to FORC. If, at decision block 502, relative failure rates to FORC are not desired (i.e., absolute FITs are desired), the subroutine 500 proceeds to block 504, where power and temperature maps are utilized along with technology and implementation parameters. Based on calculated temperature, FIT rates are computed by calculating the value of FORC for every component (or sub-component) and multiplying the technology/environment-independent values of the failure rates for each of the components by the corresponding FORC values.

On the other hand, if relative FIT rates to weighted FORC are desired (as reflected in decision block 506), FIT rates are computed in block 508 by calculating the normalized value of FORC for every component (or sub-component) and multiplying the technology/environment-independent values of the failure rates for each of the components by the corresponding normalized FORC values. Then, regardless of whether absolute FIT values, FORC values or weighted FORC values are desired, the subroutine 500 proceeds to block 510, where the adjusted FIT rates are summed up to produce the total FIT rate of the evaluated microarchitecture in block 512.

Figure 6:
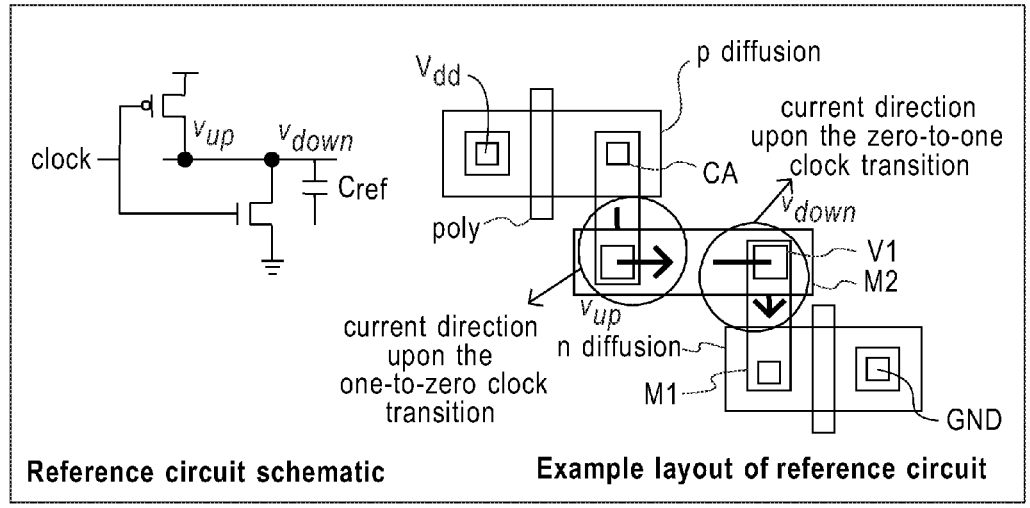
FIG. 6 is an exemplary reference circuit for use in predicting the lifetime reliability of an integrated circuit device with respect to electromigration in a technology/environment independent manner.
Figure 7:
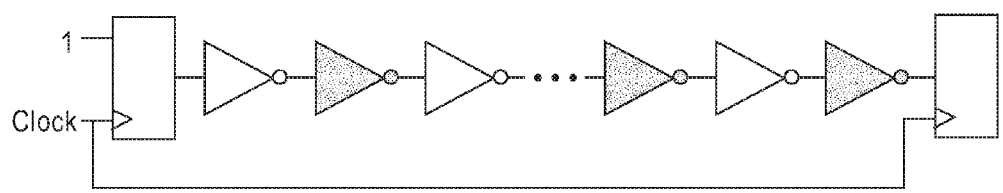
FIG. 7 is an exemplary reference circuit for use in predicting the lifetime reliability of an integrated circuit device with respect to NBTI in a technology/environment independent manner.
Figure 8:
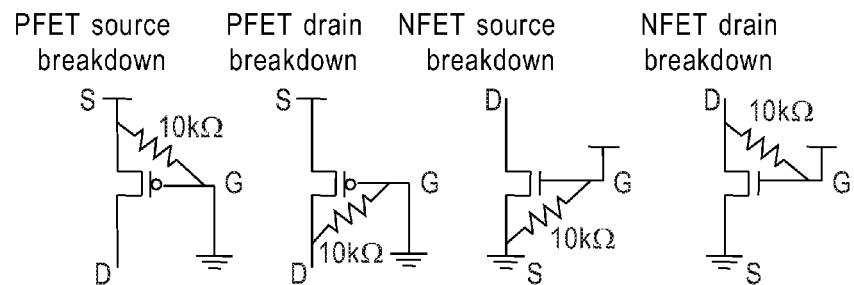
FIG. 8 is an exemplary reference circuit for use in predicting the lifetime reliability of an integrated circuit device with respect to TDDB in a technology/environment independent manner.

Referring generally now to FIGS. 6 through 8, exemplary reference circuits for the above described failure mechanisms are illustrated, in conjunction with determining FORC expressions for each mechanism.

Electromigration is a well-known and well-studied failure phenomenon that can occur on conductor lines. The portions of conductor lines most vulnerable to EM are vias interconnecting different metal layers that experience unidirectional current flow. FIG. 6 illustrates an example reference circuit vulnerable to EM. The outputs of the PFET and NFET devices are connected through a segment of M2 metal, as shown in the layout portion (b) of FIG. 6. As a result, $v_{up}$ and $v_{down}$ vias abut the M1 metal lines to M2, connecting the outputs of the PFET and the NFET devices. When the clock transits from one to zero, the PFET device conducts, and current flows through $v_{up}$ upward from M1 to M2 in order to charge the wire capacitance of the M2 line, given by $C_{ref}$. There is little current through $v_{down}$ because the NFET device is non-conducting. Conversely, on the zero-to-one transition of the clock, the NFET device conducts, and current flows through $v_{down}$ downward from M2 to M1 in order to discharge $C_{ref}$, while little current flows through $v_{up}$. As a result, $v_{up}$ and $v_{down}$ are subject to an average unidirectional current of $(C_{ref} \cdot V_{dd})/t$, where t is the clock period. This causes the vias to be vulnerable to EM effects. Based on Black's equation, the FIT of the reference circuit (vias in this case) for EM failures is described by the following:

$$FORC_{EM} = \frac{10^9}{A_{EM}} \cdot \left(\frac{C_{ref} \cdot V_{dd}}{t}\right)^n \cdot e^{-\frac{Ea\_EM}{kT}},$$

where $A_{EM}$ and n are empirical constants, $E_{\alpha\_EM}$ is the activation energy for EM, k is Boltzmann's constant, and T is absolute temperature in degrees Kelvin. Using this notion of FORC, failure rates of microarchitectural components due to EM can be expressed in relative terms of $FORC_{EM}$, in order to isolate the architect from low-level peculiarities associated with technological and environmental parameters such as $A_{EM}$, $V_{dd}$, t, $E_{\alpha\_EM}$, and T.

NBTI occurs when the input to a gate is low while the output is high, resulting in an accumulation of positive charges at the interface between gate oxide and silicon. This accumulation causes the threshold voltage, $V_T$, of the PFET device to increase over time, which results in a slowdown in zero-to-one or one-to-zero transitions. Eventually, this can lead to circuit failure due to timing violations if the device is along a critical path. To capture this failure mechanism, FIG. 7 illustrates a reference circuit for NBTI that includes PFET devices under stress and limits allowable gate delay increase before timing violation occurs.

As shown in FIG. 7, the reference circuit includes of a series of $N_{inv}$ inverters disposed between two latches. The input of one latch should propagate through the inverter chain and be latched into the other within one clock period. Because the value of the signal changes between $V_{dd}$ and GND in passing through each inverter, the PFET device in every other inverter (shaded) is stressed and the $V_T$ of the device increases over time. This eventually can lead to a violation in the latch setup time and, ultimately, the capturing of a wrong value in the latch. In the following expression, it is assumed that microprocessors are built with a 1% timing margin. This delay margin can be converted to a maximum allowable $V_T$ increase by using the alpha power law model:

$$\Delta V_{T\_ref} = 0.01 \cdot N_{inv} \cdot \frac{(V_{dd} - V_T)}{\alpha}.$$

That is, a $V_T$ shift greater than $\Delta V_{T\_ref}$ can cause the failure of the reference circuit. This enables the derivation of the FITs of the reference circuit by applying one of a number of NBTI $V_T$ shift equations proposed thus far as follows:

$$FORC_{NBTI} = 10^9 \cdot \left(\frac{K}{\Delta V_{T\_ref}}\right)^{\frac{1}{n}},$$

where $$K = A_{NBTI} \cdot t_{ox} \cdot \sqrt{C_{ox} \cdot (V_{gs} - V_T)} \cdot e^{\frac{E_{ox}}{E_0}} \cdot e^{-\frac{Ea\_NBTI}{kT}}.$$

Here, $A_{NBTI}$, n, and $E_0$ are empirical constants and $t_{ox}$, $C_{ox}$, $E_{ox}$, $E_{\alpha\_NBTI}$, and $V_T$ are oxide thickness, oxide capacitance, electric field, the activation energy for NBTI, and the original threshold voltage, respectively.

TDDB is a failure mechanism causing a conductive path to form in gate oxide, which causes leakage current through the gate. There can be four types of gate oxide breakdown, as illustrated in FIG. 8: oxide breakdown at the PFET source, PFET drain, NFET source, and NFET drain area. The resistive path between the gate and the source or drain area leads to current flow through the gate. This can oppose the current of the logic stage that is driving the effected FET, leading to a slowdown in either zero-to-one or one-to-zero transitions, thus making the device vulnerable to timing violations. In the present model, it is assumed that for any circuit on the critical path, a single device failure is sufficient to lead to a timing violation.

One of the MTTF models for TDDB proposed thus far is applicable to all four types of breakdown, assuming continuous device stress (i.e., 100% duty cycle). Thus, the FORC for TDDB assuming either a PFET or an NFET device along the critical path with 100% duty cycle is given by:

$$FORC_{TDDB} = \frac{10^9}{A_{TDDB}} \cdot V_{dd}^{a-bT} \cdot e^{\frac{X+\frac{Y}{T}+ZT}{kT}},$$

where $A_{TDDB}$, a, b, X, Y and Z are fitting parameters derived empirically.

Figure 9:
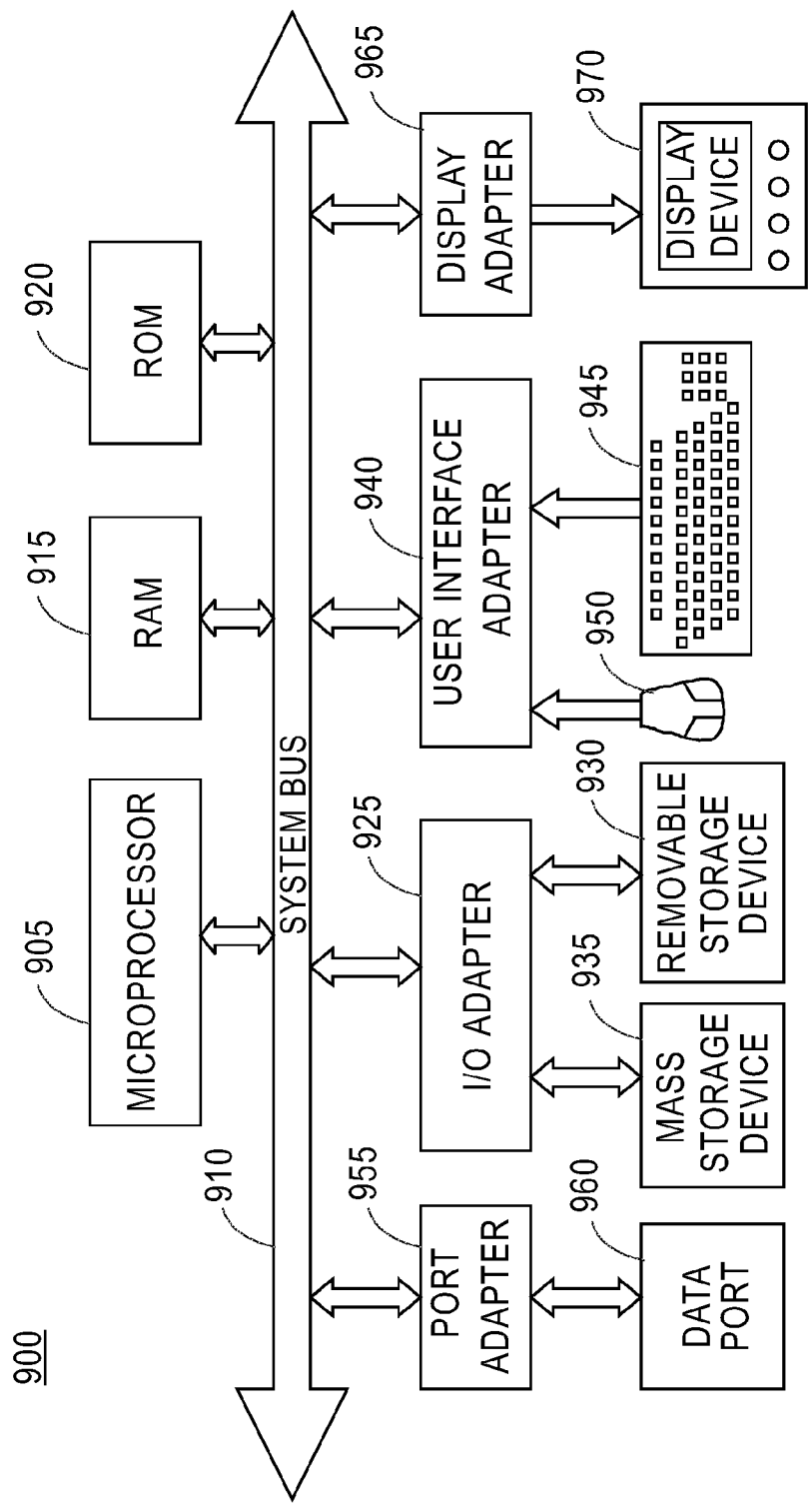
FIG. 9 is a schematic diagram of an exemplary computing environment in which the lifetime reliability prediction method embodiments may be implemented.

Generally, the method for predicting semiconductor device lifetime reliability described herein is practiced with a general-purpose computer and the method may be coded as a set of instructions on removable or hard media for use by the general-purpose computer. FIG. 9 is a schematic block diagram of a general-purpose computer for practicing the present invention. In FIG. 9, computer system 900 has at least one microprocessor or central processing unit (CPU) 905. CPU 905 is interconnected via a system bus 910 to a random access memory (RAM) 915, a read-only memory (ROM) 920, an input/output (I/O) adapter 925 for a connecting a removable data and/or program storage device 930 and a mass data and/or program storage device 935, a user interface adapter 940 for connecting a keyboard 945 and a mouse 950, a port adapter 955 for connecting a data port 960 and a display adapter 965 for connecting a display device 970.

ROM 920 contains the basic operating system for computer system 900. The operating system may alternatively reside in RAM 915 or elsewhere as is known in the art. Examples of removable data and/or program storage device 930 include magnetic media such as floppy drives and tape drives and optical media such as CD ROM drives. Examples of mass data and/or program storage device 935 include hard disk drives and non-volatile memory such as flash memory. In addition to keyboard 945 and mouse 950, other user input devices such as trackballs, writing tablets, pressure pads, microphones, light pens and position-sensing screen displays may be connected to user interface 940. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 930, fed through data port 960 or typed in using keyboard 945.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1 through 5.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of predicting the lifetime reliability of an integrated circuit device with respect to one or more defined failure mechanisms, the method comprising:
    breaking down the integrated circuit device into microarchitecture structures;
    further breaking down each structure into one or more of elements and devices, with a device comprising a sub-component of an element;
    determining, for each vulnerable device, the impact of a failure of the device on the functionality of the specific element associated therewith, and classifying the failure into one of a fatal failure and a non-fatal failure, wherein a fatal failure of a given device is one in which the failure causes the element employing the given device to fail;
    determining, for those devices whose failures are classified as fatal, one or more of an effective stress degree and an effective stress time based on one or more architecture-level events and states;
    determining one or more of a failure rate and a probability of fatal failure for the devices, using the one or more of the associated effective stress degree and effective stress time; and
    aggregating the one or more of the failure rate of the devices and the probability of fatal failures of the devices, across the structures for the one or more defined failure mechanisms.

2. The method of claim 1, wherein the structures include one or more of: register files, arrays, control logic, data paths, multiplexers, latches, repeated wires, and logic gates.

3. The method of claim 1, wherein the elements include one or more of: array/register file bitlines, array/register file wordlines, memory cells, gates of transistors, and wire repeaters.

4. The method of claim 1, wherein the devices include one or more of: metal lines, vias, PFET devices, and NFET devices.

5. The method of claim 1, wherein the failure mechanisms include one or more of: electromigration (EM), negative bias temperature instability (NBTI) and time dependent dielectric breakdown (TDDB).

6. The method of claim 5, further comprising evaluating each device to determine whether the device is vulnerable to the one or more defined failure mechanisms and eliminating from consideration those devices determined not to be vulnerable.

7. The method of claim 6, wherein a device vulnerable to electromigration comprises at least one of a metal line and a via dominated by unidirectional current flow therethrough.

8. The method of claim 6, wherein a device vulnerable to NBTI comprises a PFET device having a negative gate bias applied thereto.

9. The method of claim 6, wherein a device vulnerable to TDDB comprises one or more of: a PFET device having a logic low gate voltage and one of a logic high source and drain, and an NFET device having a logic high gate voltage and one of a logic low source and drain.

10. The method of claim 6, wherein a fatal failure of a device due to electromigration comprises a condition in which a failure of one of a metal line and a via leads to one or more of a short circuit, an open circuit, and a timing violation due to increased wire resistance.

11. The method of claim 6, wherein a fatal failure of a device due to NBTI comprises a condition in which a failure of a PFET device along a critical path leads to a timing violation.

12. The method of claim 6, wherein a fatal failure of a device due to TDDB comprises a condition in which one or more of a PFET device and an NFET device has leakage current through a gate oxide thereof exceeds a value that is able to be tolerated by logic driving the same.

13. The method of claim 6, wherein a device under stress for the electromigration failure mechanism comprises a via having current generated therethrough during one of a logical one-to-zero and a logical zero-to-one value transition of metal lines.

14. The method of claim 6, wherein a device under stress for the NBTI failure mechanism comprises a PFET device having a gate coupled to a logic low voltage and a source coupled to a logic high voltage.

15. The method of claim 6, wherein a device under stress for the TDDB failure mechanism comprises one or more of a PFET device having a gate coupled to a logic low voltage and a source coupled to a logic high voltage, and an NFET device having a gate coupled to a logic high voltage and a source coupled to a logic low voltage.

16. The method of claim 1, wherein architecture-level states comprise one or more of: a number of accesses to the device, a number of access patterns to the device, and data patterns of inputs and outputs of the device.

17. The method of claim 1, wherein architectural configuration parameters include one or more of: a number of cells in an array, a number of read ports, a number of write ports, and a number of data paths.

18. The method of claim 1, wherein defect density is calculated as the ratio of the number of fatal failures of the devices of each structure to the area of the structure.

19. The method of claim 18, wherein defect density for the electromigration failure mechanism is calculated by counting the number of vias having unidirectional current of each structure and dividing the total number of vias by the area of the structure.

20. The method of claim 18, wherein defect density for the NBTI failure mechanism is calculated by counting the number of PFETs along the critical paths of each structure and dividing the total number of PFETs by the area of the structure.

21. The method of claim 18, wherein defect density for the TDDB failure mechanism is calculated by counting the number of gate oxide breakdowns of both PFET and NFET devices of each structure, and dividing the total number of breakdowns by the area of the structure.

22. The method of claim 18, wherein the aggregating one or more of the failure rate of the devices and the probability of fatal failures of the devices is implemented by one or more of summation and weighted summation.

23. The method of claim 6, wherein the failure rates are computed in terms of a technology and environment independent failures-in-time (FIT) of a reference circuit (FORC) defined for each of the failure mechanisms.

24. The method of claim 23, wherein the failure rates are further computed in absolute values utilizing power and temperature maps along with technology and implementation parameters, by calculating the value of FORC for each component and multiplying the calculated FORC values by the technology/environment-independent values of the failure rates for each of the components.

* * * * *